(12) United States Patent
Ohkawara et al.

(10) Patent No.: US 6,445,664 B1
(45) Date of Patent: Sep. 3, 2002

(54) DISC PLAYER HAVING AN IMPROVED DISC CARTRIDGE LOADING SYSTEM (75) Inventors: Masamitsu Ohkawara; Yoshihiro Ichikawa; Yuji Morita; Yoshihiro Seshime; Masashi Kurosawa, all of Saitama-ken (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/264,217

(22) Filed: Mar. 5, 1999

(30) Foreign Application Priority Data

Mar. 19, 1998 (JP) ............................................ 10-071014

(51) Int. Cl.[7] .............................................. G11B 33/02
(52) U.S. Cl. ...................................... 369/75.2; 369/77.2
(58) Field of Search ............................... 369/75.2, 77.1, 369/77.2, 75.1; 360/99.06, 99.02

(56) References Cited

U.S. PATENT DOCUMENTS

| | | | | |
|---|---|---|---|---|
| 5,128,918 A | * | 7/1992 | Suzuki et al. ............... | 369/77.1 |
| 5,218,593 A | * | 6/1993 | Kaneo et al. ............... | 369/77.1 |
| 5,301,176 A | * | 4/1994 | Kawachi et al. ............ | 369/75.2 |
| 5,515,357 A | * | 5/1996 | Arata et al. ................. | 369/191 |
| 5,625,612 A | * | 4/1997 | Tozune et al. .............. | 369/77.2 |
| 5,646,926 A | * | 7/1997 | Handa et al. ............... | 369/77.2 |
| 5,777,957 A | * | 7/1998 | Lyman ......................... | 369/37 |
| 5,995,469 A | * | 11/1999 | Uwabo et al. .............. | 369/77.2 |
| 6,081,494 A | * | 6/2000 | Morimoto et al. .......... | 369/77.2 |

* cited by examiner

Primary Examiner—Brian E. Miller
Assistant Examiner—Kenneth W. Fields
(74) Attorney, Agent, or Firm—Arent Fox Kintner Plotkin & Kahn, PLLC (57) ABSTRACT A disk player has a structure capable of mounting on a turntable a disc-shaped recording medium contained within a cartridge. Such disc player comprises a cartridge transporting system capable of transporting the cartridge in a direction generally parallel to a sliding direction of a shutter of the cartridge; and a pivotable chassis on which the turntable is mounted, said chassis being pivotable by a chassis driving system so as to enable said disc-shaped recording medium to be mounted on the turntable, with its pivoting axis being generally parallel to a transporting direction for transporting the cartridge.

10 Claims, 7 Drawing Sheets

PRIOR ART

FIG.11 B

PRIOR ART

DISC PLAYER HAVING AN IMPROVED DISC CARTRIDGE LOADING SYSTEM

BACKGROUND OF THE INVENTION

The present invention relates to a disc player, in particular to a disc player having an improved cartridge loading system for loading a cartridge containing a disc-shaped recording medium.

Figure 11:
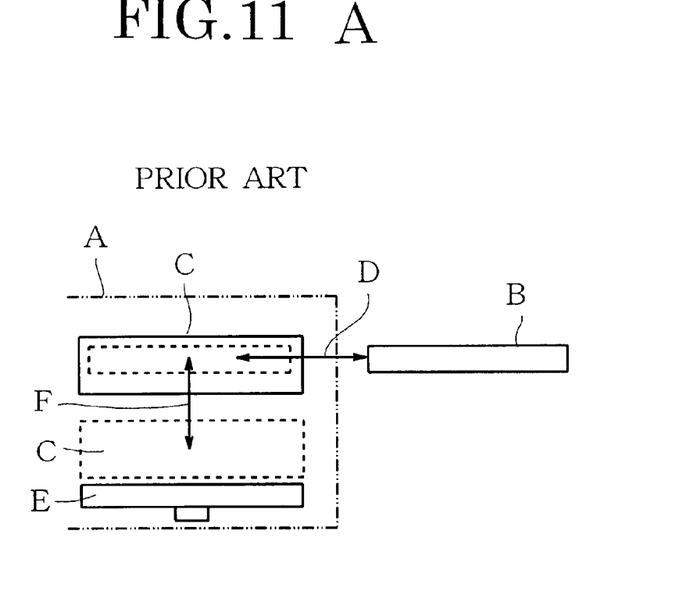
FIG. 11A is an explanatory view schematically illustrating a cartridge loading operation of a disc player made according to a prior art.
FIG. 11B is an explanatory view schematically illustrating a cartridge loading operation of a disc player made according to a prior art.

There are many types of cartridge loading system for use in a disc player, with one of the most representative examples illustrated in FIG. 11A. Referring to FIG. 11A, the known loading system comprises a cartridge B for housing a disc-shaped recording medium, a cartridge transporting means D for transporting the cartridge B to a predetermined position in a cartridge holder C located within a disc player A, a lift means F for moving down the cartridge holder C and clamping the same onto a servo mechanism E for recording information into or reproducing information from the disc-shaped recording medium.

FIG. 11B shows another example of a cartridge loading system which comprises a cartridge B for housing a disc-shaped recording medium, a cartridge transporting means D for moving the cartridge B to a predetermined position in a cartridge holder C located within a disc player A', a pivoting means H for pivoting a servo mechanism E' about a pivoting axis G arranged perpendicular to and below the transporting direction of the cartridge B. The pivoting means H is adapted to clamp the cartridge holder C to the servo mechanism E' for recording information into or reproducing information from the disc-shaped recording medium.

However, with the disc player A shown in FIG. 11A, since the lift means F has to be made relatively large in size in order to smoothly move up and down the cartridge holder C, and since many other mechanical components have to be employed for driving the loading system in a predetermined manner, it is usually difficult to manufacture a disc player with a low cost.

On the other hand, with the disc player A shown in FIG. 11B, since it is needed to have an additional driving mechanism which also has to be made large in size for smoothly driving the cartridge transporting means D and the pivoting means H, and since many other mechanical components have to be employed for driving the loading system in a predetermined manner, a total cost for manufacturing a disc player is still very high.

SUMMARY OF THE INVENTION

It is an object of the present invention to provide an improved cartridge loading system for use in a disc player, which has been simplified in its structure with the use of reduced mechanical components, so as to produce an improved disc player compact in size, thereby solving the above-mentioned problems peculiar to the above-mentioned prior arts.

According to the present invention, there is provided an improved disk player having a structure capable of mounting on a turntable a disc-shaped recording medium contained within a cartridge. Such improved disc player comprises a cartridge transporting system capable of transporting the cartridge in a direction generally parallel to a sliding direction of a shutter of the cartridge; and a pivotable chassis on which the turntable is mounted, said chassis being pivotable by a chassis driving system so as to enable said disc-shaped recording medium to be mounted on the turntable, with its pivoting axis being generally parallel to a transporting direction for transporting the cartridge.

In one aspect of the present invention, the cartridge transporting system and the pivotable chassis are all driven with the use of a single driving source.

In another aspect of the present invention, the cartridge transporting system has a carrier capable of engaging with the cartridge and transporting the cartridge in a predetermined manner, the chassis driving system has a driving plate capable of engaging with the pivotable chassis so as to enable the pivotable chassis to pivot in a predetermined manner within the cartridge holder, the carrier and the driving plate are all engageable with a single gear driven by the above single driving source.

In a further aspect of the present invention, the pivoting axis is provided on one side of the cartridge holder, and an engagement between the driving plate and the pivotable chassis is located on the other side of the cartridge holder.

In a still further aspect of the present invention, an engaging pin is integrally formed on one side of the pivotable chassis, said engaging pin is movably engageable in an inclined groove formed on the driving plate so as to slidably move in a direction generally perpendicular to a pivoting direction of the pivotable chassis, thereby enabling the pivotable chassis to pivot within the cartridge holder in a predetermined manner.

The above objects and features of the present invention will become better understood from the following description with reference to the accompanying drawings.

DETAILED DESCRIPTION OF THE PREFERRED EMBODIMENTS

Figure 1:
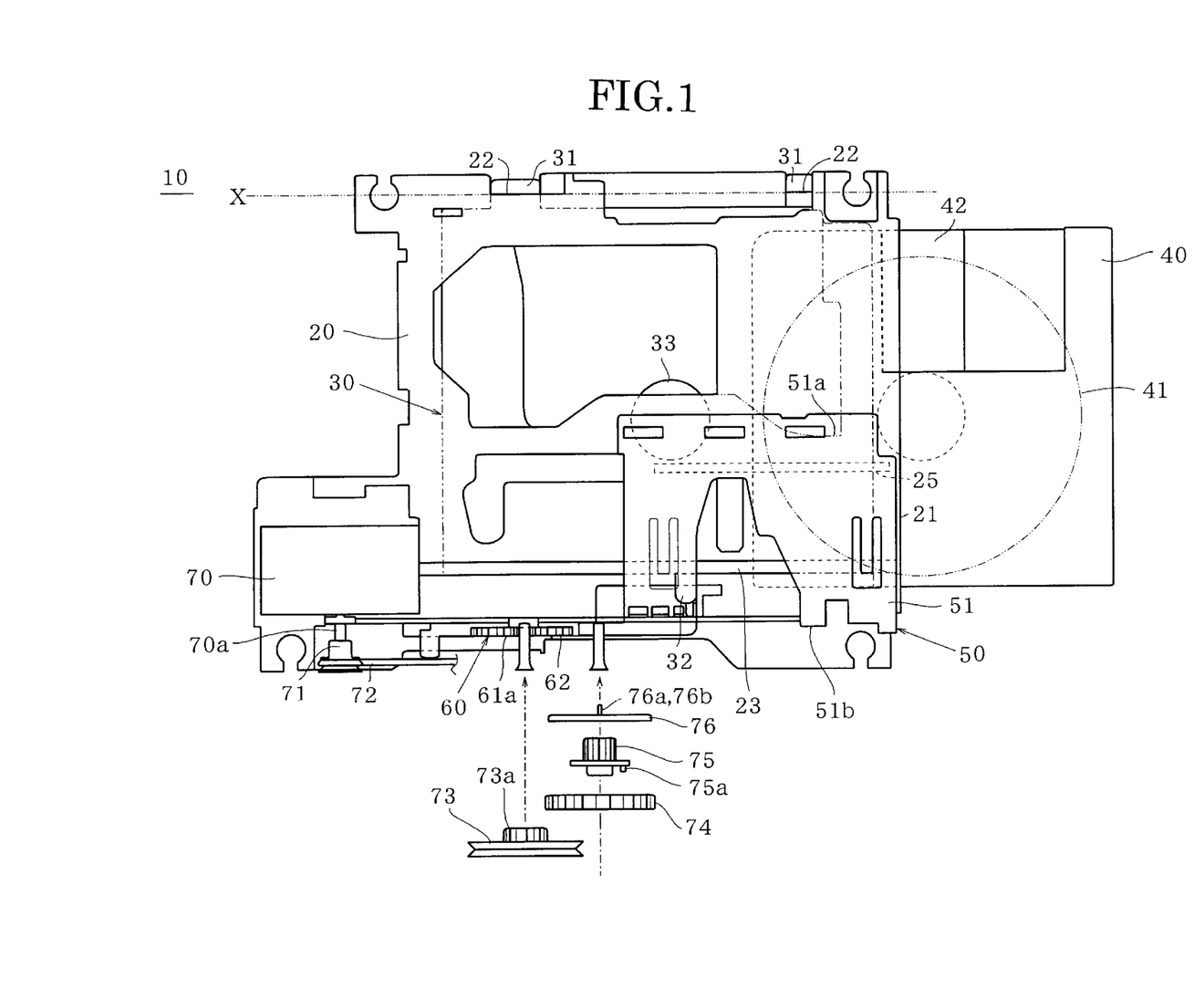
FIG. 1 is a front view schematically indicating a disc player made according to a preferred embodiment of the present invention.
Figure 2:
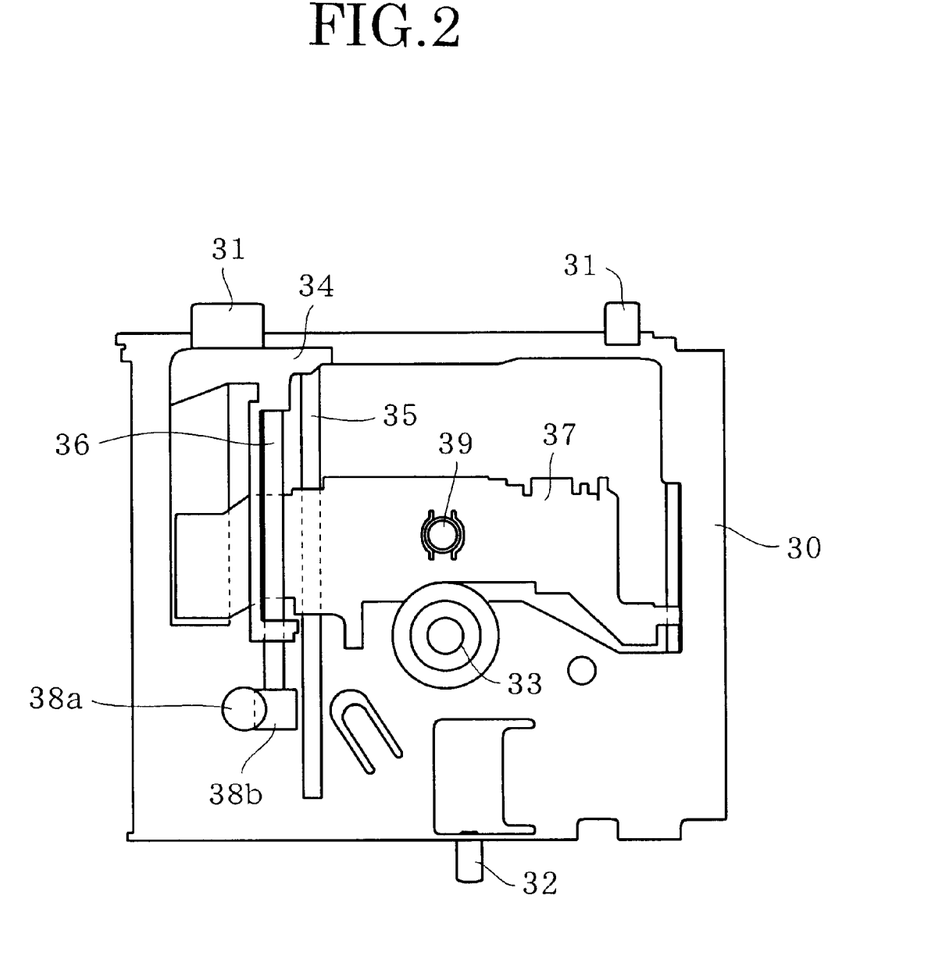
FIG. 2 is a front view schematically indicating a pivotable chassis used in the disc player of FIG. 1.
Figure 3:
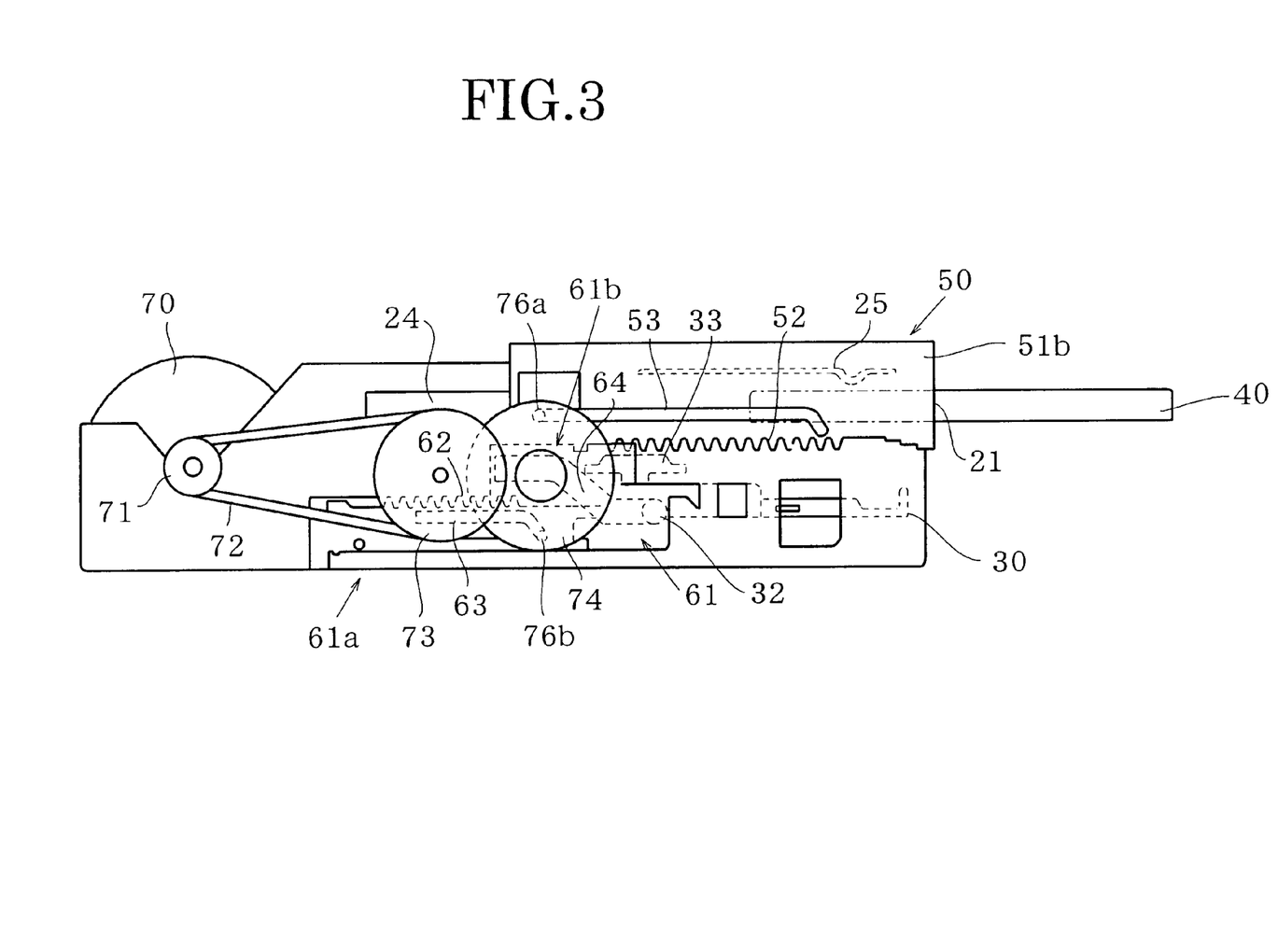
FIG. 3 is a side view schematically indicating the disc player of FIG. 1.

FIGS. 1–3 are explanatory views showing a disc player made according to a preferred embodiment of the present invention. In FIG. 1, reference numeral 10 is used to represent a disc player which has a cartridge holder 20 for holding a cartridge 40. A pivotable chassis 30 is provided within the cartridge holder 40 in a manner such that it is pivotable about a pseudo pivoting axis X extending along one side of the cartridge holder 20, as shown in FIG. 1. On the other side of the cartridge holder 20, there are provided a cartridge transporting system 50 for moving the cartridge 40, a driving system 60 for pivotally driving the pivotable chassis 30, a motor 70 for driving all of the above components.

In detail, the cartridge holder 20 is a frame structure having an elongated opening 21 on the front side thereof (on the right side in FIG. 1). The cartridge 40 having a generally rectangular shape capable of accommodating a disc-shaped recording medium 41, is allowed to be inserted into or taken out from the cartridge holder 20 through the elongated opening 21.

Further, a protection shutter 42 is provided on the cartridge 40 adjacent to one side thereof, in a manner such that the shutter 42 can be driven in the same direction as the cartridge 40 being inserted into or taken out of the cartridge holder 20.

Moreover, on the above one side of the cartridge holder 20 there are formed a plurality of retaining grooves 22, so that a plurality of hinge members 31 of the pivotable chassis 30 may be engaged in these grooves 22 and supported thereon. In this way, the pivotable chassis 30 is allowed to pivot about the pseudo pivoting axis X by virtue the hinge members 31.

FIG. 2 is a front view schematically indicating the pivotable chassis 30.

Referring to FIG. 2, the pivotably chassis 30 is also formed into a frame structure, a plurality of the hinge members 31 are outwardly protruding members integrally formed on one side of the pivotable chassis 30. With the hinge members 31 engaged in the retaining grooves 22 of the cartridge holder 20, the pivotable chassis 30 can pivot about the pseudo pivoting shaft X within the cartridge holder 20. On the other side of the pivotable chassis 30, there is provided an engaging pin 32 protruding outwardly in the same plane as the chassis main body.

A turntable 33 for turning a disc-shaped recording medium 41 is provided on the center of the pivotable chassis 30. A supporting shaft 35 and a worm gear 36 are mutually parallely arranged on the rear portion of the pivotable chassis 30 by means of a fixing member 34, extending from one side of the chassis 30 to the other. An optical pickup 37 is movably engaged through one side thereof with the worm gear 36 so as to be slidable on and along the supporting shaft 35. Further, a rotating gear 38a and an engaging gear 38b, which are in a mutually engaged condition, are provided on the pivotable chassis 30 near the worm gear 36 and the supporting shaft 35. A micro-type motor (not shown) provided on the chassis 30 is used to rotate the rotating gear 38a. With the rotation of the rotating gear 38a, the engaging gear 38b which is secured on one end of the worm gear 36, will be driven so that the optical pickup 37 may move reciprocatingly along the supporting shaft 35. In FIG. 2, a reference numeral 39 is used to represent an objective lens.

Further provided on the pivotable chassis 30 is a magnet head (not shown) which is movable up and down by virtue of a driving plate 61 (FIG. 3), as will be described in detail later.

Referring again to FIGS. 1 and 3, the cartridge transporting system 50 is used to move the cartridge 40 in a direction substantially parallel to the sliding direction of the shutter 42 on the cartridge 40. A carrier 51 is attached on the cartridge holder 20 so that it can move back and forth in the cartridge insertion direction. By virtue of such carrier 51, the cartridge 40 is allowed to smoothly move into and out of the cartridge holder 20.

In detail, the carrier 51 comprises a base plate 51a (FIG. 1) and a side plate 51b (FIG. 3), forming an L-shaped configuration when viewed along the cartridge insertion direction. In fact, the carrier 51 is allowed to slide along an elongated groove 23 formed on the cartridge holder 20 extending in the cartridge insertion direction.

FIG. 3 is a side view of the disc player 10. As shown in FIG. 3, the side plate 51b is formed extending along the side face of the cartridge holder 20. Further, the side plate 51b joins a carrier locking means (not shown) and a carrier hooking means (not shown). The carrier locking means is used to lock the carrier 51 on the cartridge holder 20, in a manner such that once the cartridge 40 is inserted into the cartridge holder 20, a locked state will he released so that the carrier 51 is enabled to move in the cartridge insertion direction. On the other hand, the carrier hooking means is used to engage the cartridge 40 when it is being inserted into the cartridge holder 20.

As show in FIG. 3, the side plate 51b of the carrier 51 is further formed with an elongated rack portion 52 in its longitudinal direction. Such rack portion 52 is allowed to engage with a driving gear 75 which will be explained in detail later.

Further, a guide groove 53 is formed in parallel with the elongated rack portion 52 on the side plate 51b, located between the elongated rack portion 52 and the above carrier locking means. As shown in FIG. 3, the guide groove 53 has a downwardly inclined front portion bending toward the rack portion 52. In detail, the guide groove 53 is so formed that it permits insertion of an upper pin 76a of a change-over ring 76, as shown in FIGS. 1 and 3.

Referring again to FIGS. 1 and 3, on the same side of the cartridge holder 20, there is provided a driving plate 61 which is movable back and forth in the cartridge insertion direction, partially serving as a driving mechanism 60 for driving the above pivotable chassis 30.

In particular, the driving plate 61 includes a driving portion 61a and an operating portion 61b. The driving portion 61a is formed with a rack portion 62 engageable with a driving gear 75 which will be described in detail later.

Further, under the rack portion 62 is formed a guide groove 63 which is generally in parallel with the rack portion 62. The guide groove 63 also has a downwardly inclined front portion. Another pin 76b of the change-over ring 76 may be inserted in the guide groove 63.

On the inner surface of the operating portion 61b of the driving plate 61, there is formed a slightly Z-shaped guide groove 64. The engaging pin 32 of the pivotable chassis 30 is allowed to engage in the guide groove 64 so that said pin 32 may slide therealong. In this way, when the driving plate 61 is moving in its longitudinal direction, the pin 32 of the pivotable chassis 30 will be forced to move up and down in FIG. 3, thereby rendering the pivotable chassis 30 to pivot about the pseudo pivoting axis X (FIG. 1), causing the chassis 30 to get in contact with or move away from a predetermined portion (not shown) within the cartridge holder 20.

In addition, a portion (not shown) of the driving plate 61 is so formed that it can serve to move the magnet head attached on the pivotable chassis 30.

A driving motor 70, which serves to provide a driving force for the chassis driving system 60 (for driving the pivotable chassis 30) and for the cartridge transporting system 50, is provided on the rear position of the cartridge holder 20.

Referring to FIGS. 1 and 3, the motor 70 has a driving shaft 70a on which is secured a pulley 71. Another pulley 73 is secured on the side wall of the cartridge holder 20. A belt 72 is attached around both the pulley 71 and the pulley 73, so that a V-shaped belt contour is formed therebetween. Referring to FIG. 1, a small gear 73a integrally molded with the pulley 73 is engageable with a large gear 74 supported on the side wall of the cartridge holder 20.

Further, on the inner side of the large gear 74 is coaxially attached another gear 75 which is engageable with both the rack portion 52 formed on the side plate 51b of the carrier 51 and the rack portion 62 formed on the driving portion 61a of the driving plate 61. As shown in FIGS. 1 and 3, a change-over ring 76 having an upper pin 76a and a lower pin 76b is coaxially provided on the inner side of the gear 75.

In detail, the upper pin 76a of the change-over ring 76 is positioned such that it can be inserted in the guide groove 53 of the carrier 51, the lower pin 76b can be inserted in the guide groove 63 of the driving plate 61.

Formed on an inwardly recessed surface of the above gear 74 are two half-circumference grooves (not shown). The driving gear 75 is formed with a projection 75a which may movably engage in the half-circumference grooves and may be stopped by end walls in each of such grooves.

A flexible clamping member 25 is attached on the cartridge holder 20, such that a cartridge 40 inserted in the cartridge holder 20 may be fixedly supported thereon.

The operation of the disc player 10 having the above-discussed structure made according to the present invention will be described in detail below with reference to FIGS. 3–10.

Referring to FIG. 3, when a cartridge 40 is begun to be loaded into the cartridge holder 20 of the disc player 10, the carrier 51 is in a position adjacent to the right end (as viewed in FIG. 3) of the cartridge holder 20, while the driving plate 61 is in a position close to the left end (as viewed in FIG. 3) of the cartridge holder 20. At this time, the rack portion 52 of the carrier 51 is engaged with the driving gear 75, while the rack portion 62 of the driving plate 61 is not engaged with the driving gear 75.

At this moment, the upper pin 76a of the change-over ring 76 is in contact with the left end of the guide groove 53 of the carrier 51, while the lower pin 76b thereof is in contact with the lower end of the inclined portion of the guide groove 63 of the driving plate 61. In this way, the upper pin 76a and the lower pin 76b of the change-over ring 76 are contained in one pseudo line that is substantially perpendicular to the insertion direction of the cartridge 40.

Once the cartridge 40 is inserted into the cartridge holder 20 through the elongated opening 21 formed on the front side thereof, the locked state of the carrier 51 is released so that the carrier 51 becomes movable. Meanwhile, the above-mentioned hooking means (not shown) of the carrier 50 is caused to engage with an engaging hole formed on one side of the cartridge 40, so that the cartridge 40 and the carrier 51 become integrally movable.

Referring again to FIG. 1, at this time, the carrier 51 is moved along the guide groove 23 to the rear (left) of the cartridge holder 20, and this movement will cause a switch (not shown) to be turned ON, so as to cause the driving motor 70 to start its rotation.

Referring again to FIG. 1, with the rotation of the driving motor 70, a driving force is transmitted through the pulley 71, the belt 72, the gear pulley 73, the small gear 73a, the large gear 74, thereby rendering the driving gear 75 to start its rotation.

Figure 4:
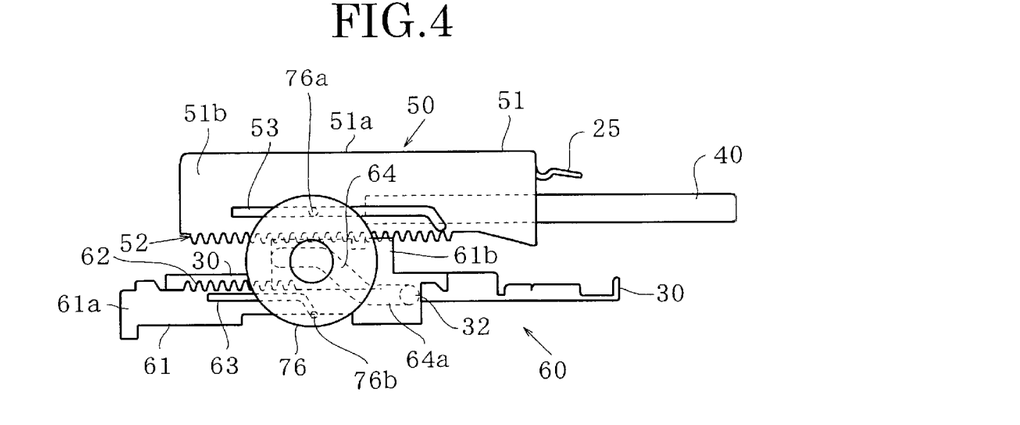
FIG. 4 is a side view schematically indicating a cartridge loading operation of the disc player of FIG. 1.

At this moment, referring to FIG. 4, since the upper pin 76a of the change-over ring 76 is still inserted in a horizontal portion of the guide groove 53 of the carrier 51, the change-over ring 76 does not rotate.

Figure 5:
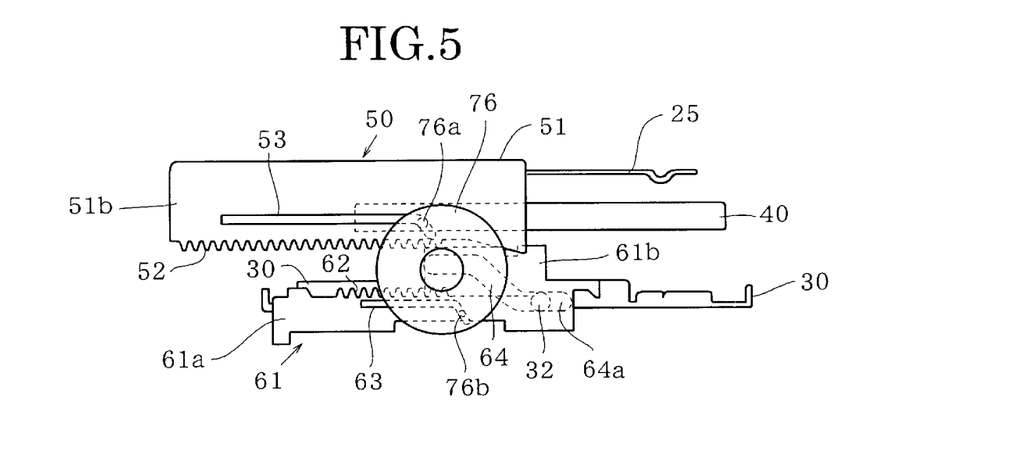
FIG. 5 is a side view schematically indicating a rack change-over operation of the disc play of FIG. 1.
Figure 6:
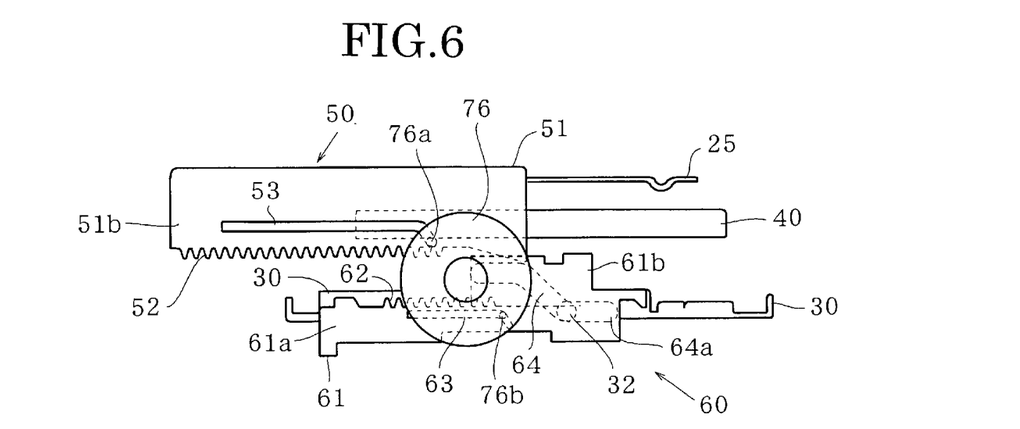
FIG. 6 is a side view schematically indicating a clamp starting operation of the disc player of FIG. 1.

However, when the carrier 51 moves towards the rear side of cartridge holder 20, the upper pin 76a of the change-over ring 76 begins to slid from the horizontal portion of the guide groove 53 to the inclined front portion thereof. When the upper pin 76a moves along the inclined portion of the guide grooves 53, the upper pin 76a is caused to move in a circular trace in the counterclockwise direction. Meanwhile, the lower pin 76b of the change-over ring 76 is also caused to move in a circular trace in the counter clockwise direction, thereby forming a circular movement of the change-over ring 76 in the counter clockwise direction. In this way, since the lower pin 76b is caused to press against the inclined portion of the guide groove 63, the driving plate 61 is forced to move rightwardly as shown in FIG. 5. In this way, the rack portion 62 of the driving plate 61 becomes engaged with the driving gear 75, thereby rendering the driving plate 61 to move also in the rightward direction.

When the change-over ring 76 is caused to rotate further in the counter clockwise direction, with the above movement of the upper pin 76a, the rack portion 52 (of the carrier 51) engaged with the driving gear 75 will be disengaged from the driving gear 75, thereby rendering the movement of the carrier 51 to stop. At this moment, the upper pin 76a is in contact with the rightmost end of the guide groove 53, and the cartridge 40 has thus arrived at a predetermined position within the cartridge holder 20.

Figure 8:
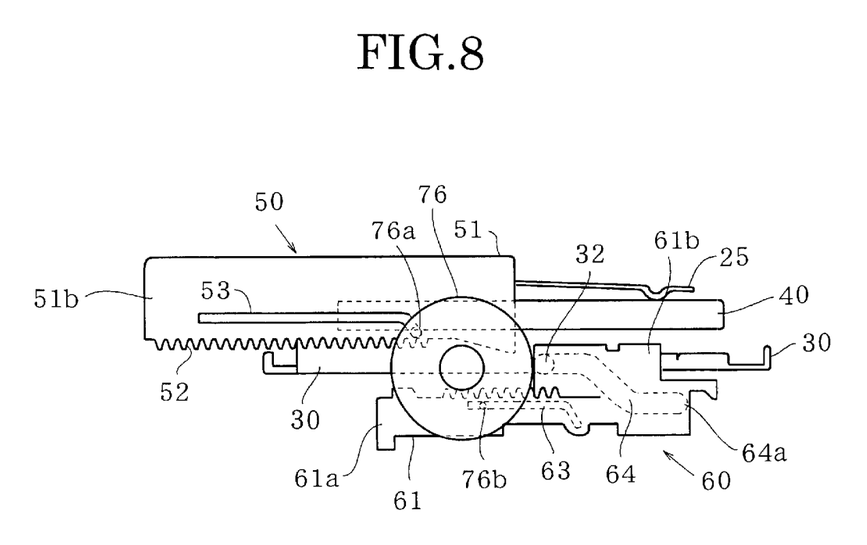
FIG. 8 is a side view schematically indicating a condition in which sound information is being recorded on a recording medium mounted within the disc player of FIG. 1.
Figure 9:
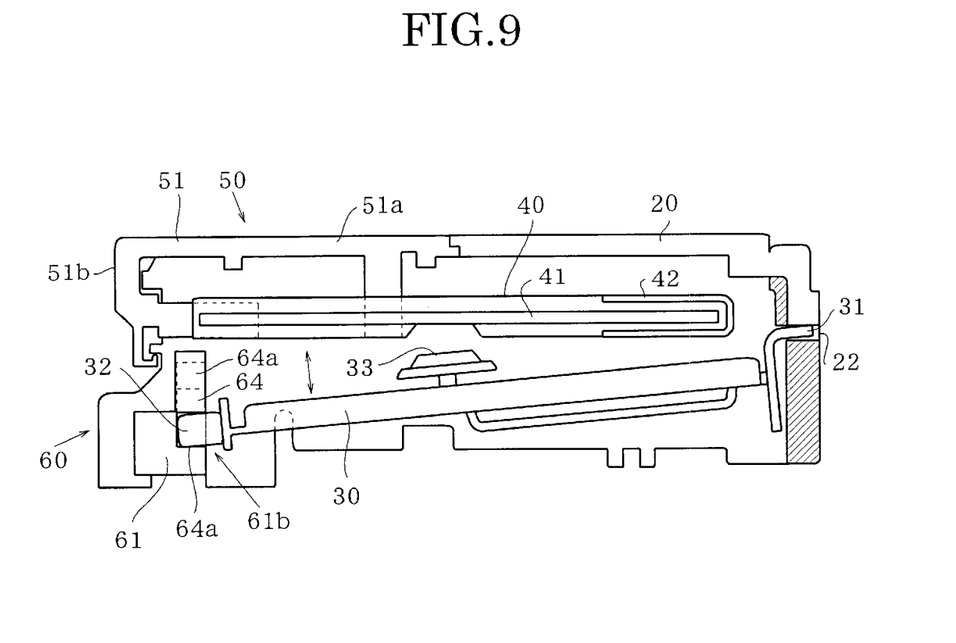
FIG. 9 is an explanatory view schematically illustrating a pivoting movement of the pivotable chassis provided in the disc player made according to the present invention.
Figure 10:
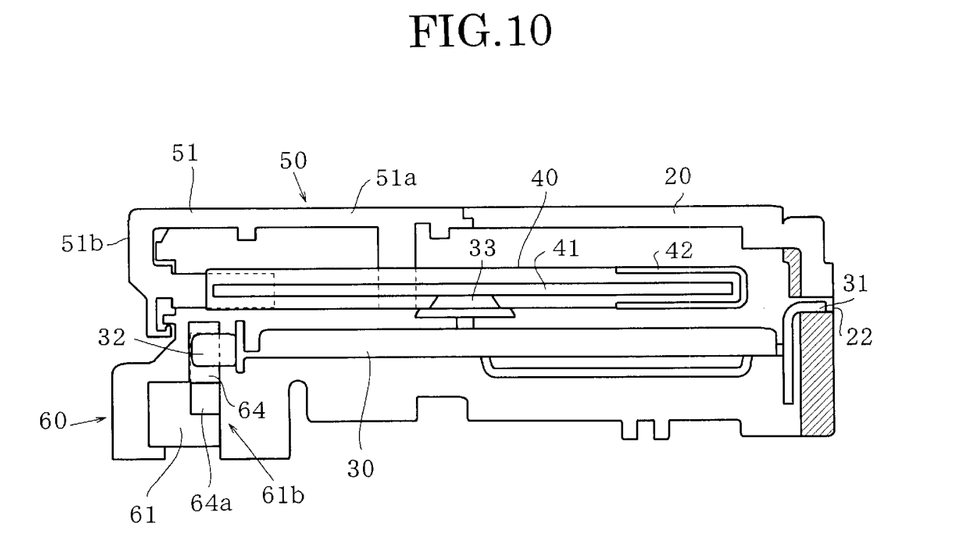
FIG. 10 is an explanatory view schematically illustrating a stopped position of the pivotable chassis provided in the disc player made according to the present invention.

Afterwards, since the driving plate 61 is further moved rightwardly, the engaging pin 32 of the pivotable chassis 30 is started to move upwardly along the inclined groove 64 of the driving portion 61a of the driving plate 61. Upon this, the pivotable chassis 30 is caused to pivot with the supporting grooves 22 of the cartridge holder 20 as pivoting fulcrums. In this manner, the pivotable chassis 30 will pivot to an operating position within the cartridge holder 20 so as to catch the cartridge 40 which has already been inserted in the cartridge holder 20, as shown in FIGS. 8 and 10.

Figure 7:
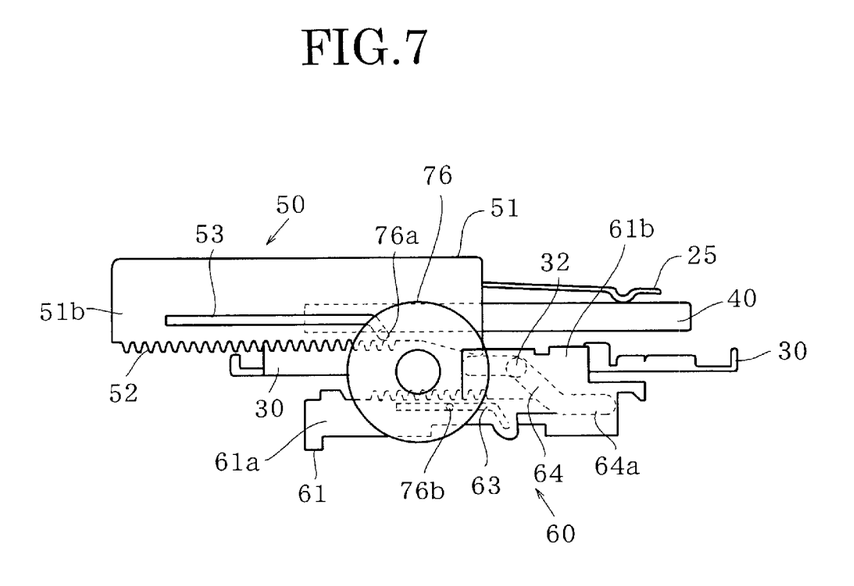
FIG. 7 is a side view schematically indicating a condition in which a recording medium is being reproduced.

Then, a switch (not shown) is turned OFF so that the driving motor 70 is stopped, thereby stopping the driving plate 61. Afterwards, the disc-shaped recording medium 41 contained in the cartridge 40 may be reproduced. At that moment, the clamping member 25 acts to press against the cartridge 40. Meanwhile, one portion (not shown) of the cartridge holder 20 is caused to press against a part of the cartridge 40 so as to exactly fix the same in position.

When a sound information is to be recorded on the disc-shaped recording medium 41 contained within the cartridge 40, the driving motor 70 is again operated to cause the driving plate 61 to move further rightward. In this way, a non-illustrated portion of the driving plate 61 acts to move down the magnetic head on the pivotable chassis 30. This time, the shutter 42 of the cartridge 40 had already been slide opened (at the time the cartridge 40 was inserted into the cartridge holder 20) by means of a shutter opening means (not shown) provided on the cartridge holder 20, so that the magnetic head is allowed to be mounted on the disc-shaped recording medium 41, thereby effecting a predetermined recording.

On the other hand, when a cartridge 40 containing a discs shaped recording medium 41 is to be detached from the cartridge holder 20, a cartridge detaching process is required to be carried out in the following procedure that is not an exactly reversed course of the above cartridge attaching process.

At first, a stop button (not shown) of the disc player 10 is pushed so as to stop the reproducing or recording process being performed on the disc-shaped recording medium 41. Then, by operating an eject button, the driving motor 70 is caused to rotate in a reversed direction, so that the driving plate 61 is moved leftwardly in the drawings. Upon such operation, the pivotable chassis 30 begins to move downwardly, so as to move away from the operating position in the cartridge holder 20.

In this way, when the driving plate 61 moves, the lower pin 76b of the change-over ring 76 will be guided to slide downwardly along a groove 63 from its horizontal portion to its inclined portion. Further, while the lower pin 76b is being guided by the inclined portion of the groove 63, the lower pin 76b will begin to move along a circular trace in a clockwise direction. In this manner, since the lower pin 76b of the change-over ring 76 is moved along a circular trace in the clockwise direction, the change-over ring 76 itself will also be caused to rotate somehow in the clockwise direction, thereby enabling the driving gear 75 to engage back with the rack portion 52 of the carrier 51, and causing the rack portion 62 of the driving plate 61 to disengage from the driving gear 75, thus causing the carrier 51 to move toward right side of the cartridge holder 20. After that, the cartridge 40 is allowed to be discharged from the cartridge holder 20 through the elongated opening 21, while the carrier 51 is stopped by the carrier locking means (not shown) so as to be retained on the cartridge holder 20.

As can be understood from the above description of the preferred embodiment, with the use of the present invention, the driving system for driving the driving plate 61 and the pivotable chassis 30 are allowed to be collected on only one side of the cartridge holder 20, so that all the operating members of the driving system can be accommodated in a reduced space, thereby making it possible to produce an improved disc player compact in size.

Further, by only reciprocatingly moving the driving plate 61, the engaging pin 32 of the pivotable chassis 30 is enabled to move up and down (FIGS. 8 and 9), guided by the inclined groove 64 formed on the driving plate 61, thereby forming a simplified system for the pivotable chassis 30 to obtain a desired pivotal movement within the cartridge holder 20.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A disc player having a structure which mounts on a turntable a disc-shaped recording medium contained within a cartridge, said disc player comprising:
    a cartridge transporting system which transports the cartridge in a direction generally parallel to a sliding direction of a shutter of the cartridge; and
    a pivotable chassis on which the turntable is mounted, said chassis being pivotable by a chassis driving system so as to enable said disc-shaped recording medium to be mounted on the turntable, with the pivoting axis of the chassis being generally parallel to a transporting direction for transporting the cartridge;
    wherein the cartridge transporting system and the pivotable chassis are all driven with the use of a single driving source;
    wherein the cartridge transporting system has a carrier which engages the cartridge and transports the cartridge in a predetermined manner; the chassis driving system has a driving member which engages the pivotable chassis so as to enable the pivotable chassis to pivot in a predetermined manner within the cartridge holder, wherein the carrier and the driving member are all engageable with a single gear driven by the single driving source.

2. The disc player according to claim 1, wherein the pivoting axis is provided on one side of the cartridge holder, and an engagement between the driving member and the pivotable chassis is located on the other side of the cartridge holder.

3. The disc player according to claim 2, wherein an engaging pin is integrally formed on one side of the pivotable chassis, said engaging pin is movably engageable in an inclined groove formed on the driving plate so as to slidably move in a direction generally perpendicular to a pivoting direction of the pivotable chassis, thereby enabling the pivotable chassis to pivot within the cartridge holder in a predetermined manner.

4. The disc player according to claim 1, wherein the driving member is a driving plate.

5. A disc player having a structure which mounts on a turntable a disc-shaped recording medium contained within a cartridge, said disc player comprising:
    a cartridge transporting system which transports the cartridge in a direction generally parallel to a sliding direction of a shutter of the cartridge; and
    a pivotable chassis on which the turntable and an optical pickup are mounted, said chassis being pivotable by a chassis driving system so as to enable said disc-shaped recording medium to be mounted on the turntable, with its pivoting axis being generally parallel to a transporting direction for transporting the cartridge,
    wherein said pivoting axis is located on one side of the center line of the cartridge moving in its transportation direction and adjacent to the shutter of the cartridge.

6. The disc player according to claim 5, wherein the cartridge transporting system and the pivotable chassis are all driven with the use of a single driving source.

7. The disc player according to claim 6, wherein the cartridge transporting system has a carrier which engages the cartridge and transports the cartridge in a predetermined manner, the chassis driving system has a driving member which engages the pivotable chassis so as to enable the pivotable chassis to pivot in a predetermined manner within the cartridge holder, the carrier and the driving member are all engageable with a single gear driven by the single driving source.

8. The disc player according to claim 7, wherein the pivoting axis is provided on one side of the cartridge holder, and an engagement between the driving member and the pivotable chassis is located on the other side of the cartridge holder.

9. The disc player according to claim 8, wherein an engaging pin is integrally formed on one side of the pivotable chassis, said engaging pin is movably engageable in an inclined groove formed on the driving member so as to slidably move in a direction generally perpendicular to a pivoting direction of the pivotable chassis, thereby enabling the pivotable chassis to pivot within the cartridge holder in a predetermined manner.

10. The disc player according to any one of claims 7 to 9, wherein the driving member is a driving plate.

* * * * *